United States Patent [19]
Blache

[11] Patent Number: 5,313,182
[45] Date of Patent: May 17, 1994

[54] MAGNET STRUCTURE FOR A DISPLACEMENT SENSOR

[75] Inventor: Claire Blache, Echirolles, France

[73] Assignee: The Torrington Company, Torrington, Conn.

[21] Appl. No.: 23,646

[22] Filed: Feb. 26, 1993

[51] Int. Cl.$^5$ ............................................. H01F 7/02
[52] U.S. Cl. .................................. 335/306; 335/207; 335/302
[58] Field of Search ........................ 335/306, 302, 207

[56] References Cited

U.S. PATENT DOCUMENTS

| | | | |
|---|---|---|---|
| 3,742,243 | 6/1973 | Gamble | 307/106 |
| 4,315,214 | 2/1982 | Kataoka | 324/208 |
| 4,829,276 | 5/1989 | Leupold et al. | 335/306 |
| 4,857,841 | 8/1989 | Hastings et al. | 335/302 |
| 5,107,238 | 4/1992 | Leupold | 335/306 |

FOREIGN PATENT DOCUMENTS

| | | |
|---|---|---|
| 0464405A1 | 1/1992 | European Pat. Off. |
| 1281549 | 10/1968 | Fed. Rep. of Germany |
| 2403854 | 8/1975 | Fed. Rep. of Germany |

Primary Examiner—Harold Broome
Attorney, Agent, or Firm—John C. Bigler

[57] ABSTRACT

Two magnetic circuits are separated by an air gap and are made up respectively of a series of permanent magnets which are attached and rigidly held together by flux return yokes. One side of the magnetic circuits is turned towards the air gap. The directions of magnetization of the opposing magnets and of the attached magnets are antiparallel and the length of each magnet is approximately two times larger than the width of the air gap.

14 Claims, 9 Drawing Sheets

MAGNET STRUCTURE FOR A DISPLACEMENT SENSOR

BACKGROUND OF THE INVENTION

This invention relates generally to magnet structures for a displacement sensor and, more particularly, to such structures which generate in an air gap a magnetic field which varies linearly over a measurement axis.

Magnetic displacement sensors are known which consist of one or more magnets producing an induction field B and of an element for measurement of the induction (Hall probe or magnetoresistance, for example) which are set in relative motion. The resolution of such a sensor is proportional to the sensitivity of the element for measuring the induction and to the gradient of this induction in the displacement range. This gradient depends on the nature of the magnets, on the form of the magnetic circuit and on its position with respect to the measurement element.

The most common devices of this type consist of a magnet attached to the device whose position must be measured. In this case, the weight of the magnet must be relatively low so as not to disturb the movement of the device.

When the probe is placed opposite the magnet, the variation of the magnetic field as a function of the displacement is large and not linear. The signal of the probe must then be processed after it is compared to reference signals. This type of device, for example, permits measurements of displacement on the order of 100 mm with a precision of 0.1 mm for a Samarium-cobalt magnet volume of 400 mm.

When the probe is placed in a zone where the field varies linearly, and if J designates the polarization axis of the magnet, the probe may be placed parallel to the axis J and the magnet moved along this axis, or the probe may be placed so it is perpendicular to axis J. The signal of the probe is then proportional to the displacement, and the induction gradient depends on the form and the nature of the magnet, as well as on the distance from the magnet to the probe. The signal is on the order of 0.1 T/mm to 1 T/mm over a distance of 0.1 to several millimeters.

The displacement measurement devices which apply these arrangements of probes and magnets are sensitive to a ferromagnetic environment. One proposed structure is a sensor of microdisplacements with magnetic circuits which provide in an air gap a large variation of induction over a measurement range from 100 to 500 μm, approximately.

Another proposed structure consists of a permanent magnet and a yoke in the form of a U, both associated, to form a closed magnetic circuit. The position of the sensor along the yoke is determined as a function of the intensity of the leakage field detected by the sensor, and the shape of the yoke can be adjusted to obtain a linear variation of the field.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a magnet structure for a linear displacement sensor consisting of two magnetic circuits which are separated by an air gap. The magnetic circuits are respectively made up of a series of permanent magnets which are attached and rigidly held together by flux return yokes, one side of which is turned towards the air gap. The directions of magnetization of the opposing magnets and the adjacent magnets are antiparallel, and that the length of each magnet is approximately two times larger than the width of the air gap.

The foregoing and other aspects will become apparent from the following detailed description of the invention when considered in conjunction with the accompanying drawing figures.

DETAILED DESCRIPTION

Figure 1:
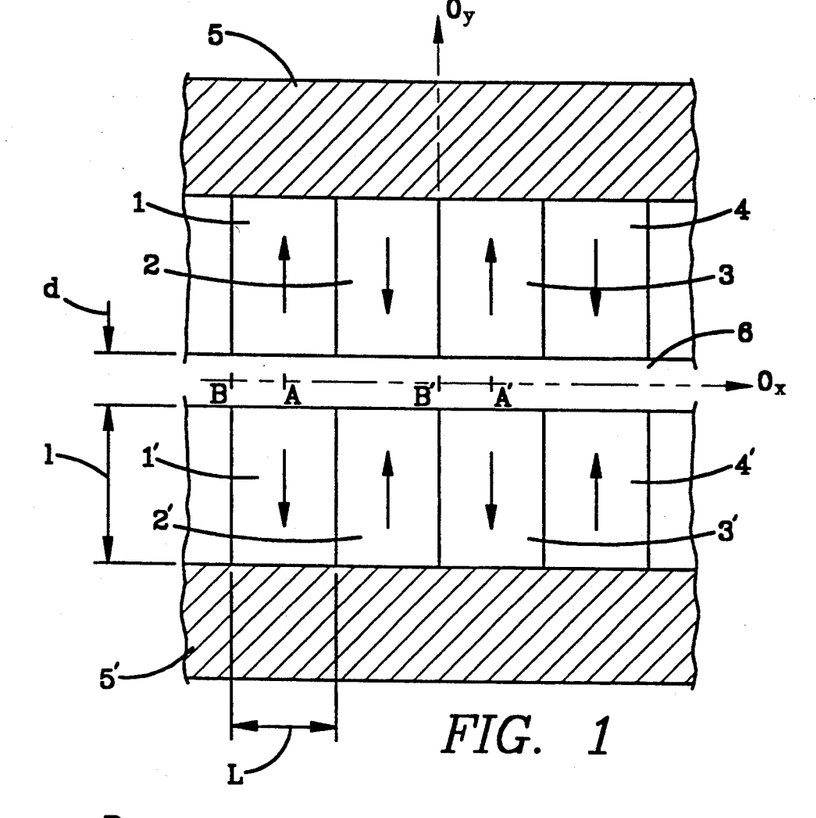
FIG. 1 is a transverse cross sectional view of a general embodiment of the structure according to the invention.

Referring now to the drawings, FIG. 1 illustrates two open, rectangular, magnetic circuits separated by an air gap 6 with width d.

Each magnetic circuit consists of a series of permanent magnets 1, 2, 3, 4 and 1', 2', 3', 4', with rectangular cross section which are rigidly interconnected by a flux return yoke 5 or 5'. The direction of magnetization of each magnet is perpendicular to the side in contact with the flux return yoke and to the side turned towards the air gap. The directions of magnetization of two adjacent magnets 1-2, 2-3, 3-4 and 1'-2', 2'-3', 3'-4', are antiparallel. The directions of magnetization of two opposing magnets 1—1', 2—2', 3—3', 4—4' separated by the air gap are also antiparallel. The polarities (north and south) in facing positions of opposing magnets are identical and these magnets repel each other.

Accessory means which are not illustrated ensure the separation of the two circuits. The magnets 1, 2, 3, 4 and 1', 2', 3', 4', are hard magnets, with a relative permeability of approximately 1, such as an Nd-Fe-B ceramic. The yokes 5, 5' are made of soft ferromagnetic material, with high permeability, such as pure iron. The structure generates in the air gap along the measurement axis Ox a magnetic induction field characterized by a normal component $B_y$ of zero and a periodic tangential component $B_x$. The variation of this tangential component is represented as a triangular profile when the ratio of magnet length L to air gap width d is essentially equal to 2.

Figure 2:
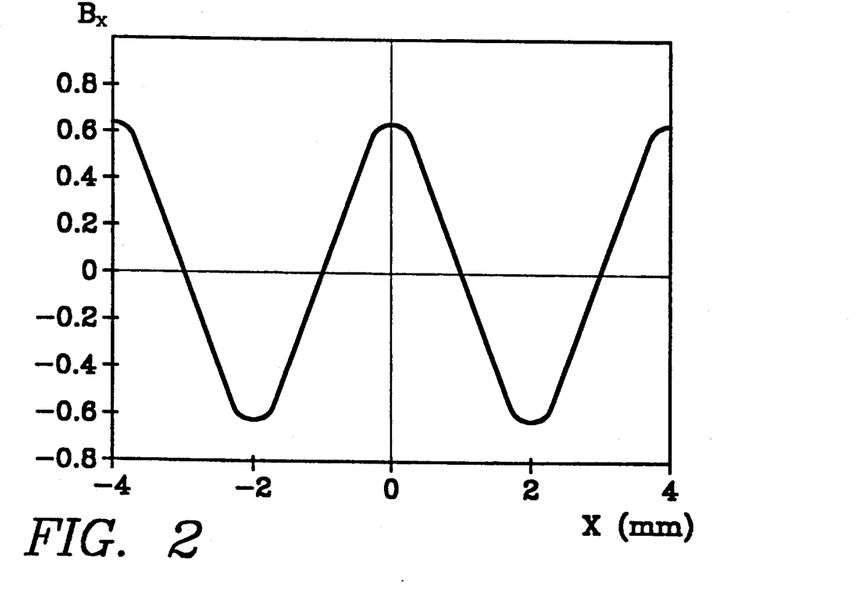
FIG. 2 indicates the variation of the magnetic induction field in the air gap of the structure illustrated in FIG. 1.

This profile is shown in FIG. 2. It is characterized by a slope p which obeys the empirical equation $p = CJ/d$, in which $C = 0.7$; J is the remanence of the material and d is the width of the air gap. With high-energy magnets $J = 12,000$ Gauss and an air gap with small dimension $d = 1$ mm, a slope p equal to 8.4 Gauss/$\mu$m is obtained. The linear displacement measurement range represents 70 percent of the magnet length L. For a magnet length $L = 2$ mm and an air gap $d = 1$ mm, the linear range is essentially equal to 1.4 mm. These results are obtained for magnets whose thickness l is higher than or equal to the length L.

To construct a linear displacement sensor, one or more of the linear parts of this triangular profile are utilized, from one or more periods of the structure of FIG. 1. One or more devices for measurement of component $B_x$ as a function of the number of periods of the selected magnetic circuit is positioned in the air gap.

Figure 3:
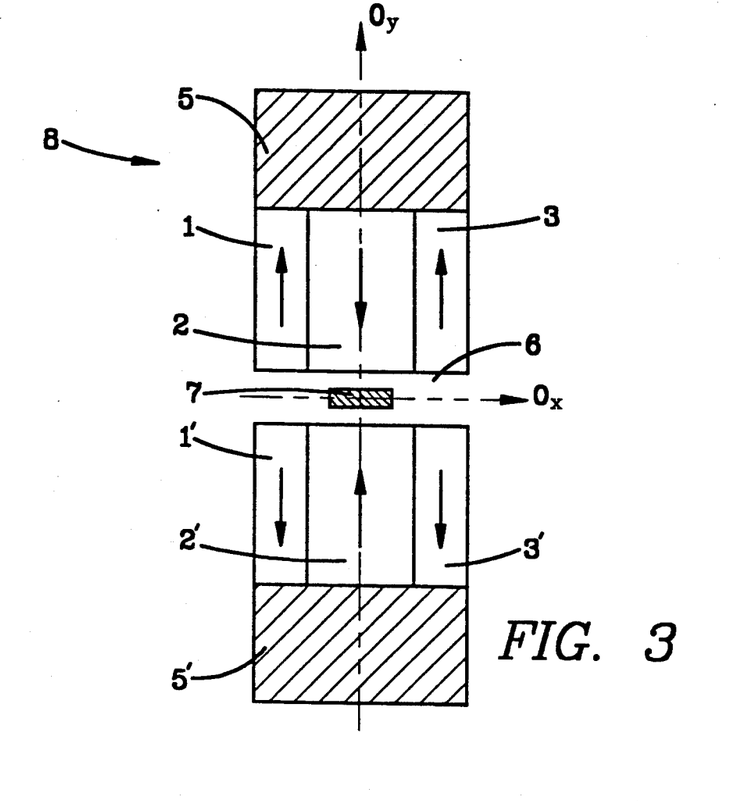
FIGS. 3 and 5 are transverse cross sectional views of two displacement sensors in an application of the structure illustrated in FIG. 1.

FIG. 3 illustrates the transverse cross section of a sensor 8 which shows a magnet circuit consisting of two groups of three magnets 1, 2, 3 and 1', 2', 3', associated with two flux return yokes 5, 5' and placed on both sides of an air gap 6. The circuit extends over a period AA' of FIG. 1. The lateral magnets 1, 3 and 1', 3', then have, along the direction of displacement, a length which is at least equal to half the length of the central adjacent magnets 2 and 2'. A measurement device 7 is placed in the center of the air gap 6 at equal distances from the magnets 2 and 2' (along the y axis) and at the center of the magnets 2 and 2' (along the x axis). The device 7 can be a Hall effect probe placed perpendicularly to the tangential component of the magnetic induction field $B_x$, or a magnetoresistance device placed parallel to this same component.

Figure 4:
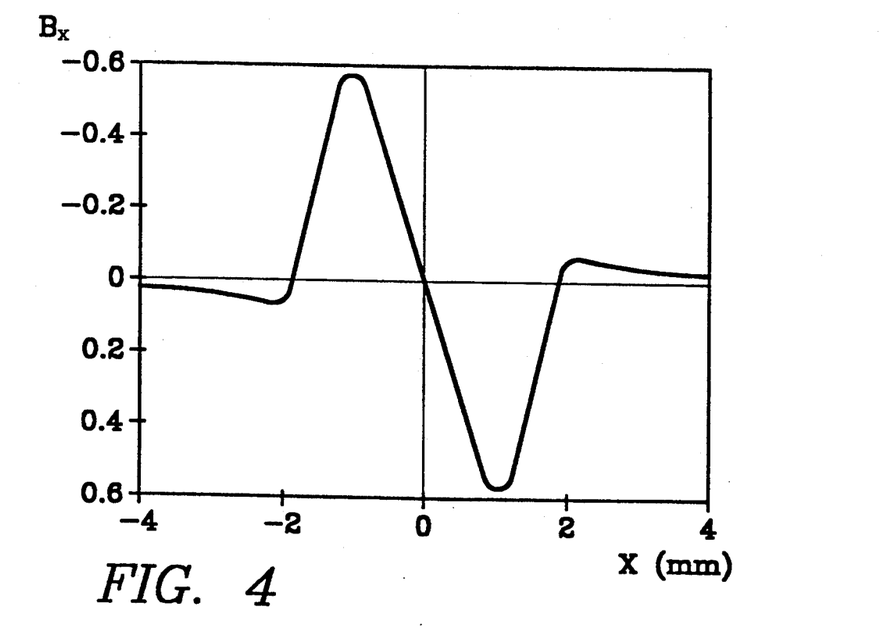
FIGS. 4 and 6 indicate the variations of the magnetic induction field in the air gap of the sensors illustrated in FIGS. 3 and 5.

FIG. 4 illustrates the variation profile of the tangential component of the magnetic induction field $B_x$ of the structure illustrated in FIG. 3. The normal component $B_y$ is zero. The profile is identical to the profile in the period AA' of the circuit shown in FIG. 1 in the central linear part. Another sensor device 8 may be constructed by selecting magnets such as 2, 3, 4 and 2', 3', 4', instead of the magnets 1, 2, 3 and 1', 2', 3'. The variation $B_x$ of the induction will then be the opposite that of FIG. 4.

Figure 5:
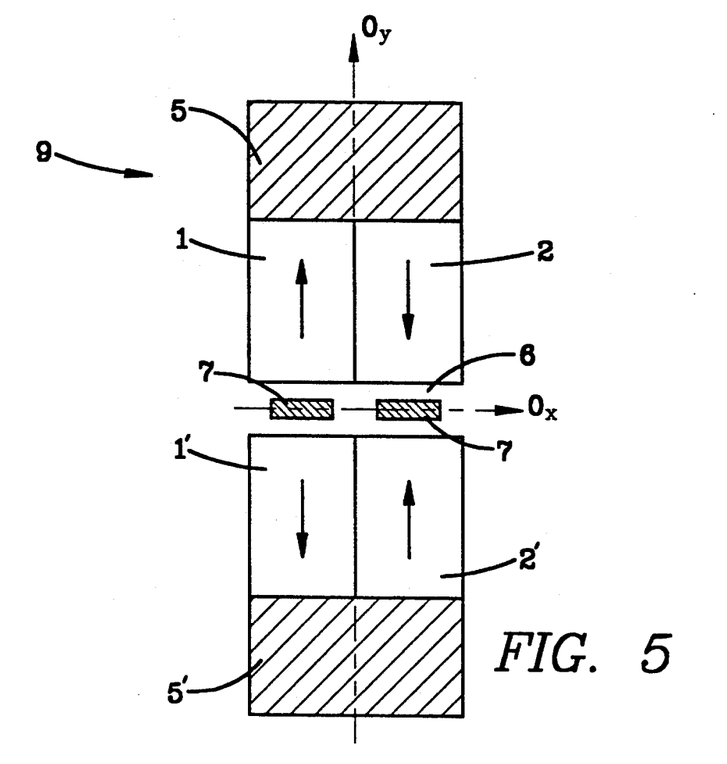

FIG. 5 illustrates a transverse cross section of a sensor 9 with magnetic circuits consisting of two groups of two magnets 1, 2 and 1', 2' associated with two flux return yokes 5, 5' and placed on both sides of an air gap 6 with a periodicity such as BB' of FIG. 1. Two measurement devices 7 are placed in the air gap at equal distances from the magnets 1, 1' and 2, 2' (along the Oy axis) and approximately halfway between the lateral sides of the magnets 1, 1' and 2, 2' (along the Ox axis) along two perpendicular coordinate axes Ox and Oy.

Figure 6:
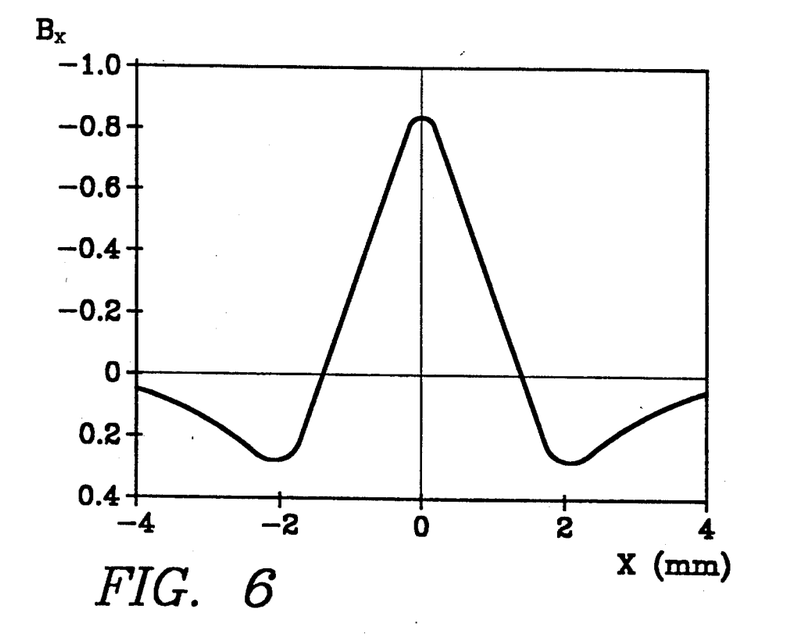

FIG. 6 illustrates the variation profile of the tangential component of the magnetic induction field $B_x$ of the structure illustrated in FIG. 5. The normal component $B_y$ is zero. The profile is identical in the center to that of the BB' period of the device shown in FIG. 1. The lateral parts of the profile are absorbed by the "edge effect". In an equivalent device the magnets 2, 3 and 2', 3', replace the magnets 1, 2 and 1', 2'. The profile of FIG. 6 will then be inverted with respect to the Ox axis. The sensitivity of the position sensor of FIG. 5 is twice that of the sensor 8 illustrated in FIG. 3. By the use of two measurement devices 7, the consequences of thermal variations on the circuits are reduced.

Figure 7:
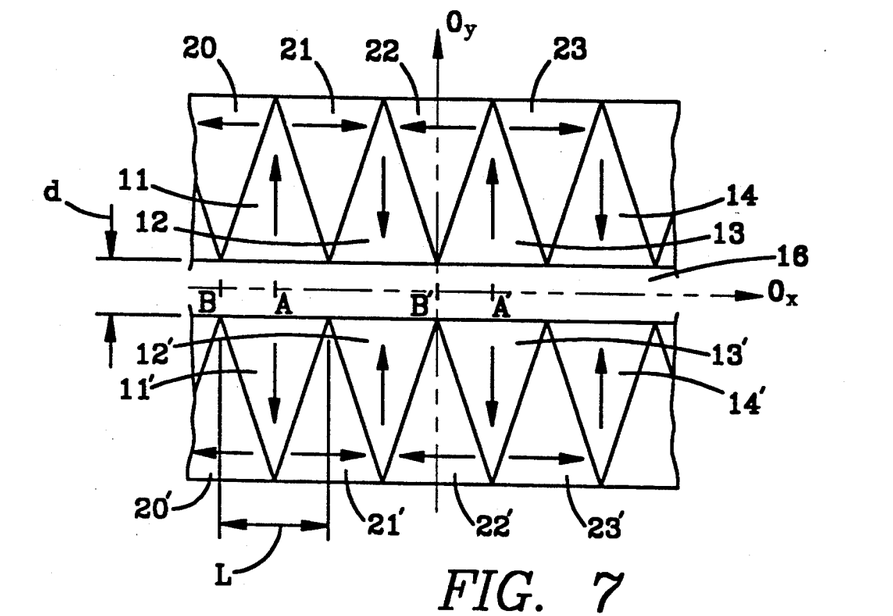
FIG. 7 is a transverse cross sectional view of a general embodiment of a structure with prismatic magnets.

FIG. 7 illustrates a transverse cross section of an alternative embodiment of the structure. Two open magnetic circuits are placed on both sides of an air gap 16. Each one of the magnetic circuits consists of a series of principal permanent magnets 11, 12, 13, 14 or 11', 12', 13', 14', with triangular cross section. These magnets are rigidly connected to each other by secondary magnets 20, 21, 22, 23 or 20', 21', 22', 23', with triangular cross section.

The triangular cross section of each magnet (principal and secondary) is identical. The contour of the section is an isosceles triangle whose equal angles are essentially 67.5 degrees. For each one of the principal magnets 11, 12, 13, 14 or 11', 12', 13', 14', the direction of magnetization is perpendicular to the base (turned towards the air gap).

The directions of magnetization of two successive principal magnets (11–12, 12–13, 13–14, 11'–12', 12'–13', 13'–14') are antiparallel; the directions of magnetization of two principal magnets which face each other (11—11', 12—12', 13—13', 14—14',) are also antiparallel. The poles (north or south) which are opposite are identical, and two-by-two opposing magnets thus repel each other. For each one of the secondary magnets 20, 21, 22, 23 or 20', 21', 22', 23', the direction of magnetization is parallel to the base of its section and it is in flux continuity with the flux of the principal magnets.

This structure generates in the air gap 16, over the measurement axis Ox, a magnetic induction field characterized by a normal component $B_y$ of zero, and a periodic tangential component $B_x$. The variation profile of this component is identical to that of FIG. 2 when the ratio of the length L of the magnet base to the width d of the air gap is approximately equal to 2. The slope obeys the same empirical equation $p = CJ/d$ but with a coefficient C of 0.9. With high-energy magnets $J = 12,000$ Gauss and an air gap of small dimension $d = 1$ mm, a slope p equal to 10.8 Gauss/$\mu$m is obtained. This slope is approximately 20 percent larger than that obtained with the structure of FIG. 1, and the length of the linear range is not modified.

This improved result is the consequence of the presence of the secondary magnets 20, 21, 22, 23 and 20', 21', 22', 23', instead of the flux return yoke 5, 5', which act as flux concentrators. The flux concentration effect is maximum for an angle of 67.5 degrees. When this angle is reduced to 45 degrees, for example, the flux leakages at the magnet bases are minimal, but the flux concentration effect is reduced.

The elements of the above-described structure allow the realization of a displacement sensor. In this case, one or more devices for measuring the tangential component of the magnetic induction field as a function of the number of selected periods is placed in the air gap.

Figure 8:
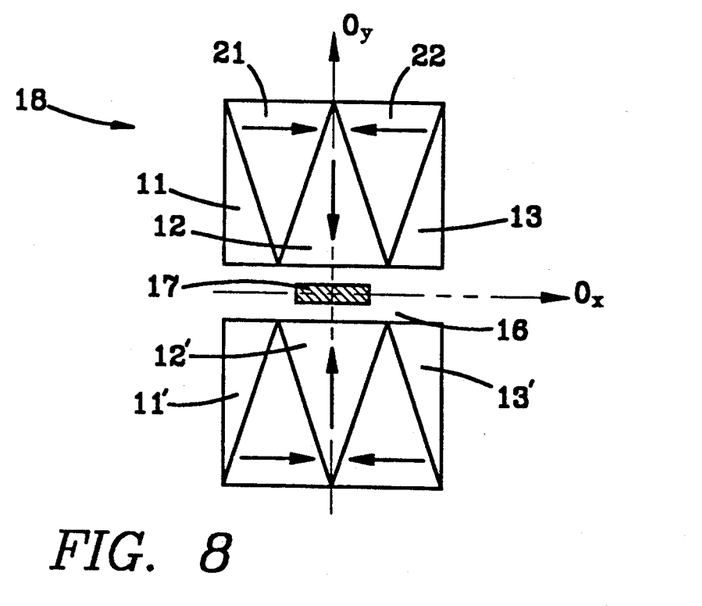
FIGS. 8 and 9 are transverse cross sectional views of two displacement sensors in an application of the structure illustrated in FIG. 7.

According to FIG. 8, the transverse cross section of the sensor 18 provides a magnetic circuit consisting of two groups of five magnets 11, 12, 13, 21, 22 and 11', 12', 13', 21', 22' placed on both sides of the air gap 16 over the extent of a period AA' of the device shown in FIG. 7. The fractionated lateral magnets 11, 13 and 11', 13', have a base whose length has been reduced by half compared to that of central magnets 12 and 12'. The measurement device 17 is placed in the center of air gap 16 at equal distances from the magnets 12 and 12' (along the axis Oy) and at the center of the magnets 12 and 12' (along the Ox axis). Measurement device 17 is either a Hall effect device placed perpendicularly with respect to the tangential component of the magnetic induction field $B_x$ or a magneto-resistance device placed in parallel to the same component.

The variation profile of component $B_x$ of the structure illustrated in FIG. 8 is identical to that of the profile of the period AA' of the device shown in FIG. 7. The sensitivity of the sensor 18 is the product of the sensitivity of the measurement device and of the slope of the magnetic induction field (p=0.9 J/d). The measurement range then is ±0.7d.

Figure 9:
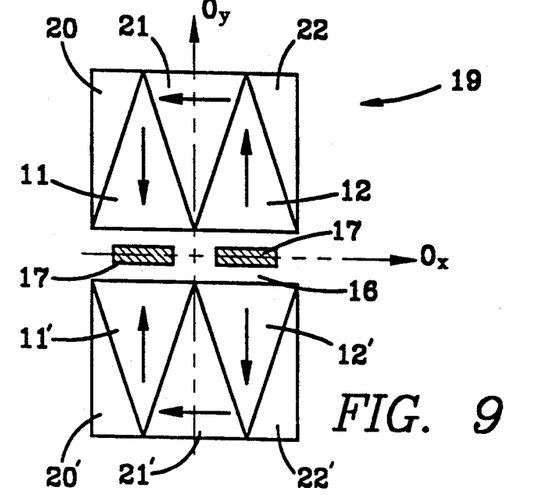

Another device may be constructed by selecting the magnets 21, 22 and 21', 22' instead of and in the place of the magnets 11, 12, 13, 11', 12', 13' as indicated in FIG. 9. The transverse cross section of the sensor 19 shows a magnetic circuit consisting of two groups of five magnets 11, 12, 20, 21, 22 and 11', 12', 20', 21', 22' placed on both sides of the air gap 16. This is period BB' of the device illustrated in FIG. 7. The lateral magnets 20, 22 and 20', 22' have a base which is equal to half of those of the central magnets 21 and 21'. Two measurement devices 17 are placed in the center of the air gap 16 at equal distances from the opposite principal magnets 11, 11' and 12, 12' (along the Oy axis) and approximately in the center of the magnets 11, 11' and 12, 12' (along the Ox axis).

The variation profile of the induction component $B_x$ is identical to that of the induction profile of the period BB' of the structure shown in FIG. 7, but it differs slightly in the lateral sides because of edge effects. An equivalent device with the magnets 12, 13, 21, 22, 23 and 12', 13', 21', 22', 23' of FIG. 7 instead of the magnets 11, 12, 20, 21, 22 and 11', 12', 20', 21', 22' can also be constructed according to FIG. 9. The induction profile will then be opposite that of FIG. 8. The sensitivity of the position sensor 19 with two measurement devices 17 is then twice that of the sensor 18 with one measurement device 17.

The sensors 18 and 19 consist of magnetic circuits without a flux return yoke and are made from hard permanent magnets ($\mu=1$). Other derived magnetic circuits can be realized by successive modifications of the directions of polarization by 90 degrees.

Figure 10:
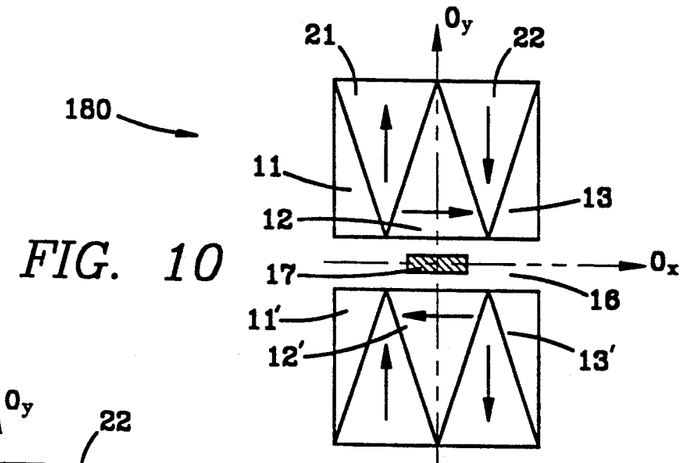
FIGS. 10 and 11 are alternative embodiments of the sensors illustrated in FIGS. 8 and 9.

FIG. 10 illustrates a sensor 180 derived from sensor 18, in which the polarization directions have been shifted by +90 degrees in the same direction. The magnetic field in the air gap 16 has rotated by −90 degrees. If the dimensions of the magnets are identical, the normal component of induction $B_y$ generated by the magnetic circuit of the sensor 180 is equal to the tangential component of the induction $B_x$ generated by the magnetic circuit of the sensor on the measurement axis Ox. It is therefore preferred to use a Hall effect probe in the sensor 180 and a magneto-resistance in the case of the sensor 18.

Figure 11:
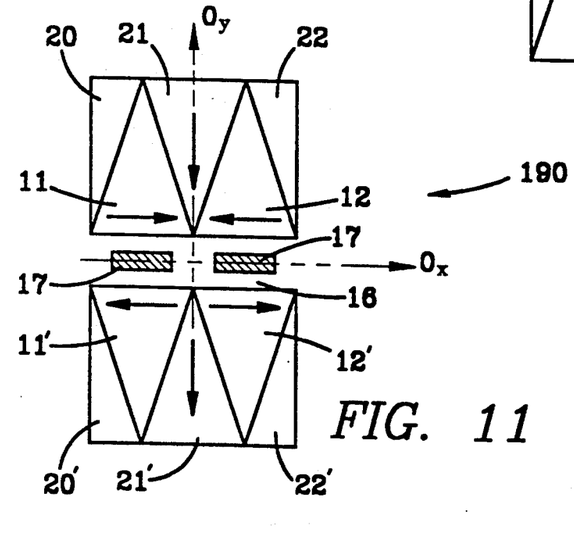

FIG. 11 illustrates a sensor 190 which is derived from the sensor 19. The geometry of the magnetic circuit of the sensor 190 is identical to that of the magnetic circuit of sensor 19. The directions of polarization have been rotated by +90 degrees while the magnetic field in the air gap has rotated by −90 degrees. For identical dimensions, the normal component generated by the magnetic circuit of the sensor 190 is equal to the tangential component of the induction $B_x$ generated by the magnetic circuit of the sensor 19, on the measurement axis Ox. It is therefor preferred to use a probe with Hall effect with sensing element in the case of the sensor 190 and a magneto-resistance in the case of the sensor 19.

Figure 12:
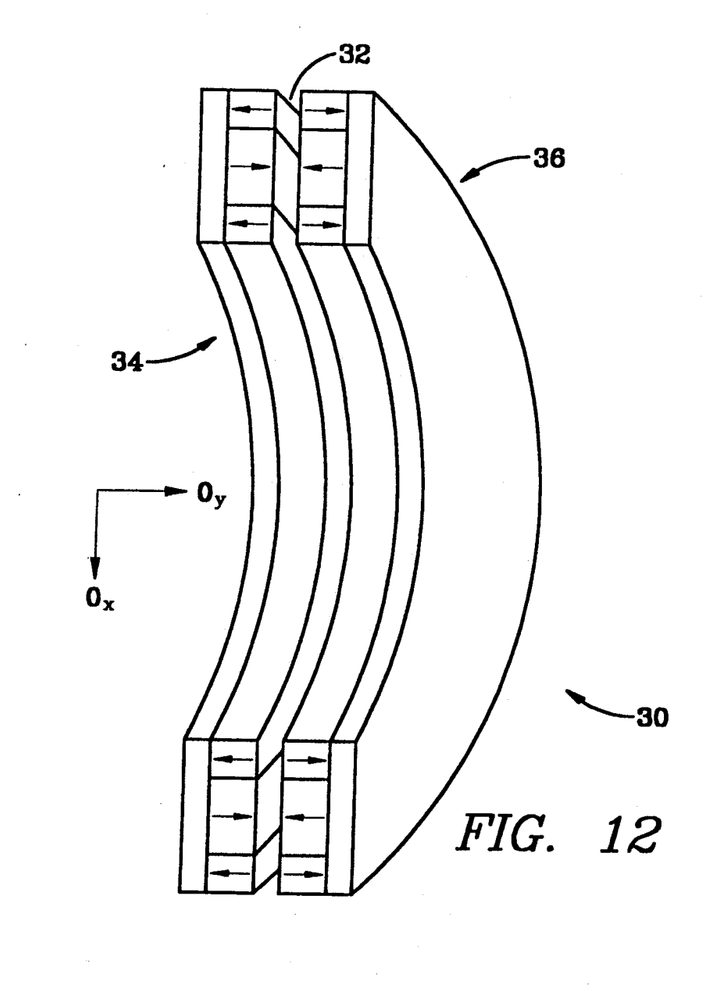
FIGS. 12 and 14 are perspective views with diametrical cross section of two magnetic circuits in the form of rings with axial polarization.

FIG. 12 is a perspective view with diametrical cross section of a symmetrical ring-shaped magnetic structure 30 with axial air gap 32. The structure comprises two circuits 34, 36 with three magnets in the form of a ring connected by a crown-shaped yoke. The transverse cross section of the structure is similar to that shown in FIG. 3.

Figure 13:
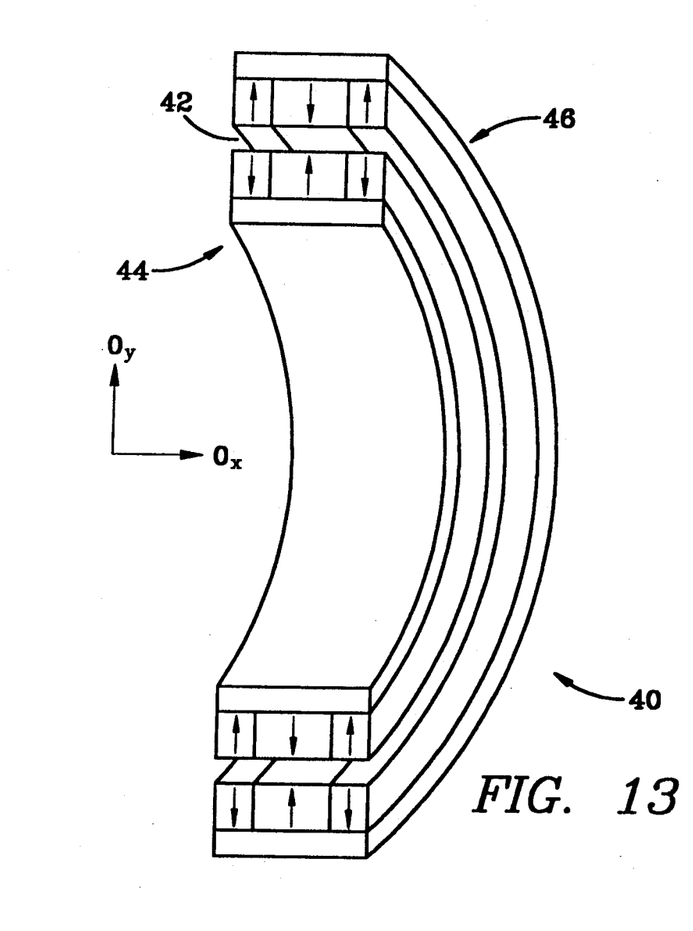
FIGS. 13 and 15 are perspective views with diametrical cross section of two magnetic circuits in the form of rings with radial polarization.

FIG. 13 is a perspective view with diametrical cross section of an alternative symmetrical ring-shaped magnetic structure 40 with a radial air gap 42. The structure comprises two circuits 44, 46 of three magnets in the form of rings, connected by a cylindrical yoke. The transverse cross sections of the structure is that shown in FIG. 3.

Figure 14:
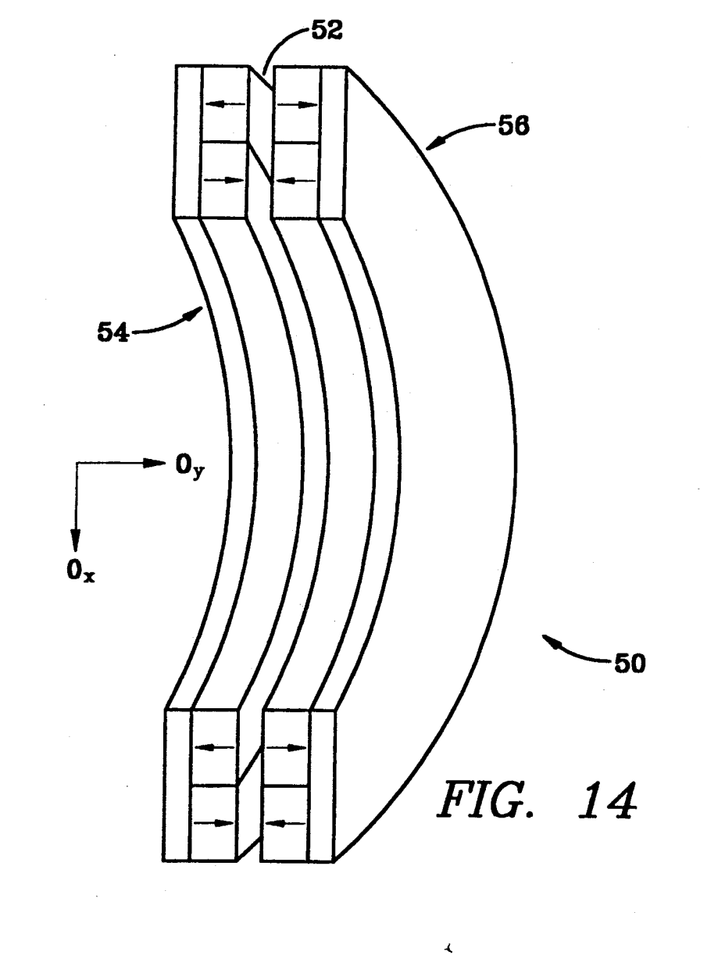

FIG. 14 is a perspective view with diametrical cross section of an alternative symmetrical ring-shaped magnetic circuit 50 with axial air gap 52. The structure comprises two circuits 54, 56 with two magnets in the form of rings, connected by a crown-shaped yoke. The transverse cross sections of the structure is similar to that shown in FIG. 5.

Figure 15:
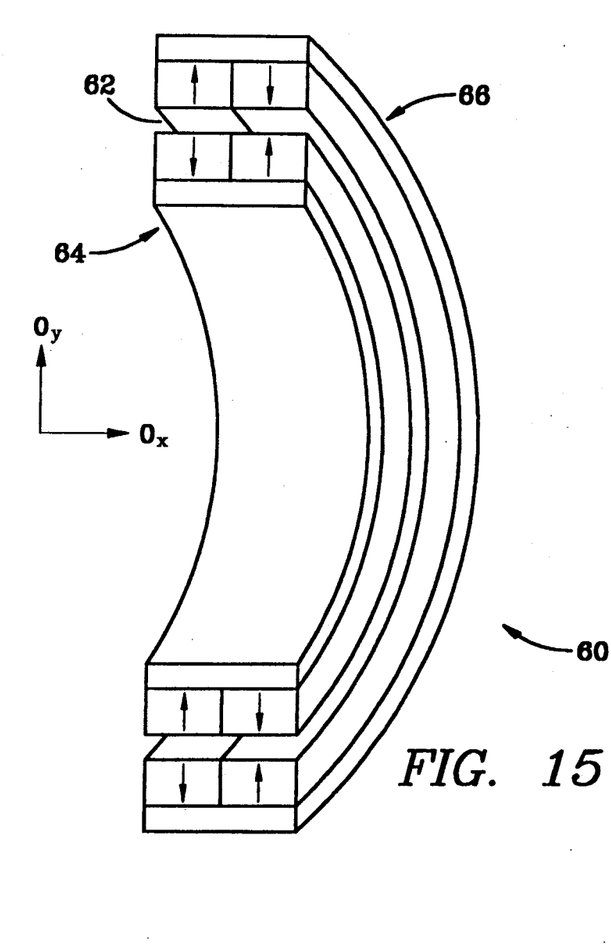

FIG. 15 illustrates an alternative of symmetrical ring-shaped magnetic circuit 60 with radial air gap 62. The structure comprises two circuits 64, 66 with two magnets in the form of rings, connected by a cylindrical yoke. The transverse cross section of the structure is similar to that shown in FIG. 5.

Figure 16:
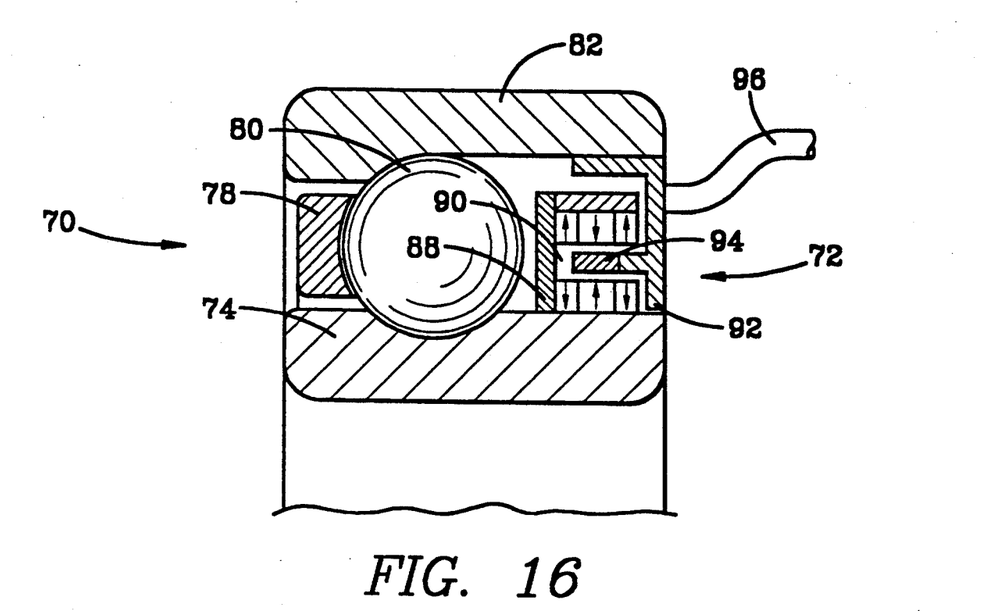
FIGS. 16 through 19 are cross sectional views of ball bearings equipped with alternative embodiments of displacement sensors with axial and radial sensitivity, respectively.

FIG. 16 illustrates the transverse cross section of a ball bearing 70 provided with a linear sensor 72 for small axial displacements. The ball bearing 70 has an internal ring 74 intended to be mounted on a rotating shaft, a ring-shaped cage 78 which holds each of the balls 80 of the bearing, and an external ring 82 which is an integral part of a fixed support which is not illustrated. On the interior ring 74, a ring-shaped magnetic circuit as described with reference to FIG. 13 is affixed by gluing.

The interior magnetic rings are directly glued onto the interior ring 74, made of a steel with high magnetic permeability. The two circuits are rigidly connected to each other by a crown 88, also made of a magnetic material, so as to delimit a radial ring-shaped air gap 90. On the external ring 82 of the ball bearing 70, the support 92 of a measurement probe 94 is placed between the rings in the middle of the air gap 90. The radial section of the support 92 has the shape of an F whose lower branch bears the probe 94.

The measurement probe 94 is connected by a connection cable 96 to a treatment circuit which is not illustrated. Due to the high magnetic gradient generated in the ring-shaped air gap 90 during the rotation of the ring 74, the measurement probe 94 generates a relatively large analog signal which is representative of the small relative axial displacements (with an amplitude from 10 to 100 $\mu$m) of the rings 74 and 82. Such displacements are, for example, the consequence of elastic deformations undergone by the ring 74, 82 and the balls 80, due to the effect of the axial forces applied to the shaft or to the support of the external ring 82 of the bearing.

Figure 17:
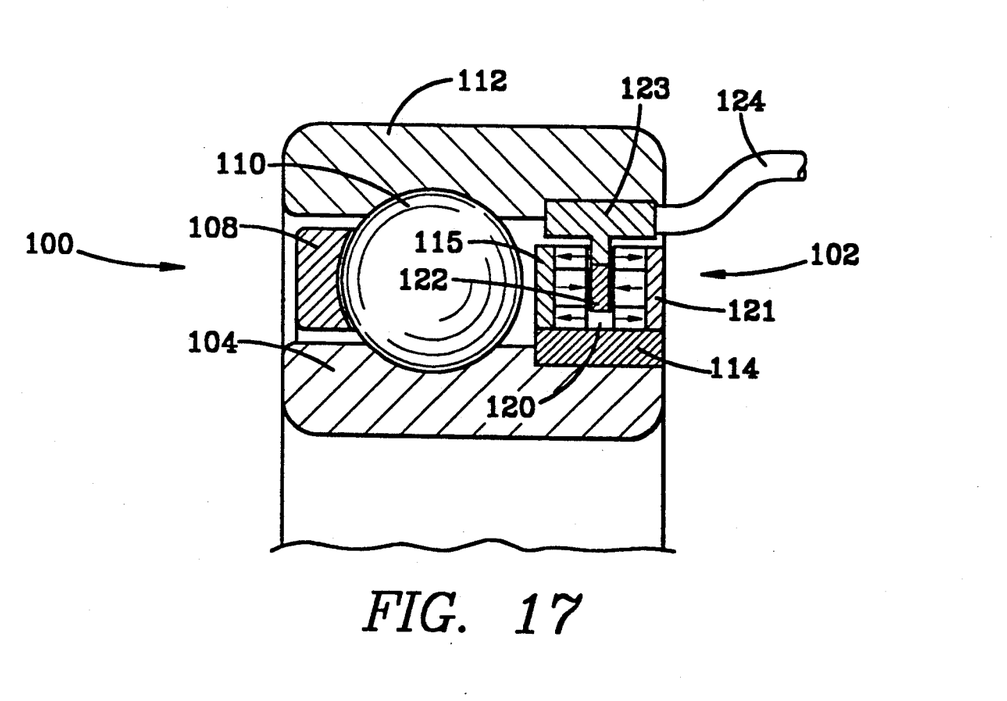

FIG. 17 illustrates the transverse cross section of a ball bearing 100 provided with a linear sensor 102 for small radial displacements. The bearing 100 has an internal ring 104 which is attached rigidly to a rotating shaft, a ring-shaped cage 108 holding each ball 110 of the bearing and an external ring 112 which is an integral part of a fixed support which is not illustrated.

On the interior ring 104, an intercalated crown 114 made of an amagnetic material is affixed by gluing, and to it are affixed by gluing two stacks of three magnetized rings, with axial polarization, respectively attached to two yokes in the form of a circular crown 115 and 121, similar to those of FIG. 12, and separated by an axial air gap 120. The T-shaped support 123 of a measurement probe 122 placed between the rings and in the middle of the air gap 120 is mounted rigidly on the external ring 112 of the bearing 100. The measurement probe 122 is connected by a connection cable 124 to a processing circuit which is not illustrated.

When the shaft is rotating, the measurement probe 122 generates a relatively large analog signal which is representative of the small relative radial displacements (with amplitude from 10 to 100 μm) of the rings 104 and 112 of the bearing 110, resulting from radial forces applied to the shaft and/or to the support (not illustrated) of the external ring 112 of the bearing.

Figure 18:
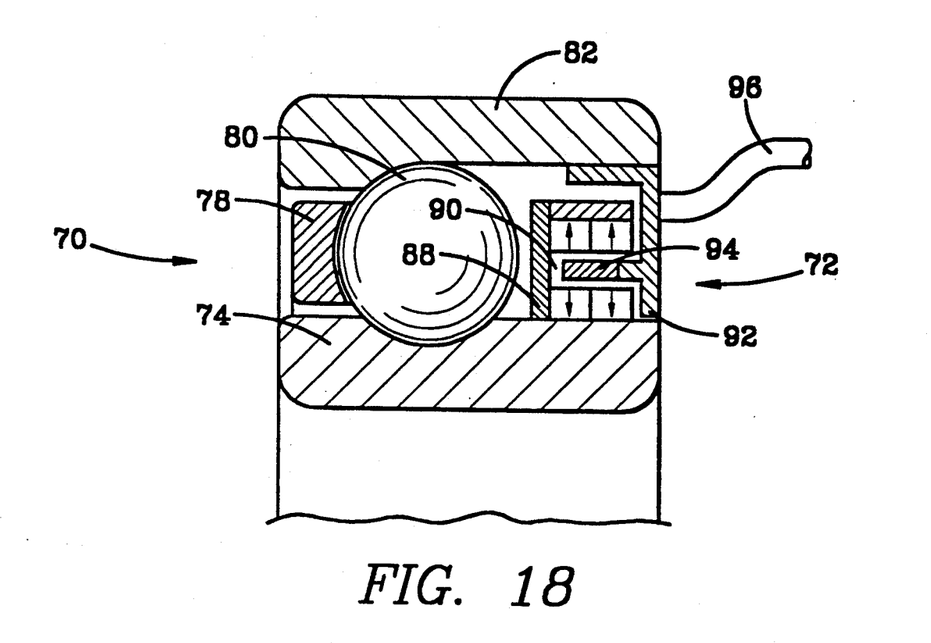

FIG. 18 illustrates the transverse cross section of a ball bearing 70 fitted with a linear sensor 72 for small axial displacements. The bearing 70 has an internal ring 74 which is attached rigidly to a rotating shaft, a ring-shaped cage 78 holding each of the balls 80 of the bearing, and an external ring 82 which is an integral part of a fixed support which is not illustrated. On the interior ring 74, a symmetrical ring-shaped magnetic circuit with radial polarizations is affixed by gluing.

The magnetic circuit of FIG. 18 is similar to the one shown in FIG. 15 and comprises an internal magnetic double ring and an external magnetic double ring. In comparison to the cross section of the magnetic circuit of FIG. 15; however, the internal magnetic ring has no flux return yoke. That element is replaced by the interior ring 74 of the bearing 70, made of a steel with high magnetic permeability.

The magnetic rings are rigidly connected to each other by a crown 88 made of an amagnetic material so as to delimit a radial ring-shaped air gap 90. On the external ring 82 of the ball bearing 70, the support 92 of two measurement probes placed between the magnetized rings and in the middle of the air gap 90 is mounted rigidly. The cross section of the support 92 has the shape of an F. The measurement probes are connected by a connection cable 96 to a processing circuit which is not illustrated.

Due to the high magnetic gradients generated in the ring-shaped air gap 90 during the rotation of the shaft, the combination of the two measurement probes generates a relatively large analog signal which is representative of the small relative axial displacements (with amplitude from 10 to 100 μm) of the rings 74 and 82 of the bearing 70. Such displacements are the consequence of elastic deformations which are undergone by the rings 74, 82 and the balls 80 due to the action of axial forces applied to the shaft and/or to the support (which is not illustrated) of the exterior ring 82 of the bearing.

Figure 19:
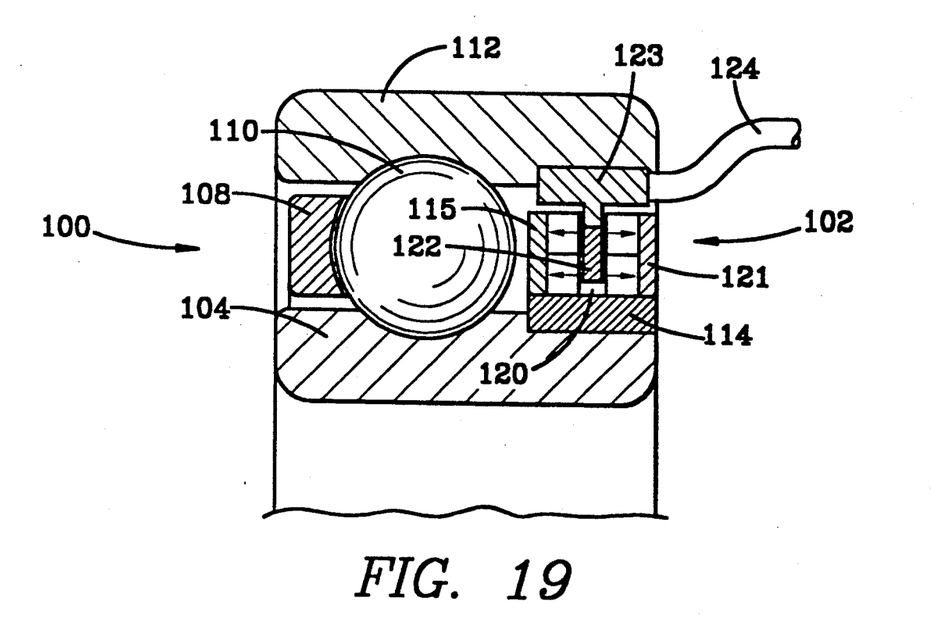

FIG. 19 illustrates the transverse cross section of a ball bearing 100 with linear sensor 102 for small radial displacements. The bearing 100 has an interior ring 104 which is attached rigidly to a rotating shaft, a ring-shaped cage 108 holding balls 110 of the bearing, and an external ring 112 which is an integral part of a fixed support which is not illustrated.

On the interior ring 104 an intercalated crown 114 which is entirely amagnetic is affixed by gluing, and to it are attached by gluing two pairs of magnetized rings with axial polarizations, which are respectively attached to two crown-shaped yokes 115 and 121, similar to the pairs of rings 54 and 56 of FIG. 14, and separated by an axial air gap 120. On the external ring 112 of the bearing 100, the T-shaped support 123 of two measurement probes 122 placed between the pairs of rings in the middle of the air gap 120 is attached rigidly. The measurement probes 122 are connected by a connection cable 124 to a processing circuit which is not illustrated.

Due to the great sensitivity of the arrangement shown in FIG. 19, and because the shaft is rotating, the combination of the two measurement probes generate a relatively large analog signal which is representative of the small relative radial displacements (with amplitude from 10 to 100 μm) of the rings 104 displacement and 112 of the bearing 110. Such relative radial displacements are the result of the radial forces applied to the shaft 106 and/or to the support (which is not illustrated) of the external ring 112 of the bearing.

From the above description, it will be apparent that the invention provides a magnetic circuit which generates a triangular field profile in an air gap and which is adapted to measure displacement up to 1-2 mm. In addition, since the linear zone of displacement is larger than that of previous structures a measurement device with a larger size of the sensing element may be utilized, to increase the sensitivity of the sensor. The flux return yokes allow for the confinement of magnetic flux inside a structure.

The invention utilizes a magnetic structure which consists of two identical open magnetic circuits placed on both sides of an air gap. Each magnetic circuit consists of juxtaposed permanent magnets which are connected rigidly by a flux return yoke. The directions of magnetization of two adjacent magnets are opposite and perpendicular to the side in contact with the flux return yoke and to the side in contact with the air gap for the purpose of realizing one side in contact with the air gap presenting an alternate series of north and south poles.

According to another aspect of the invention, the two open magnetic circuits are placed on both sides of the air gap in such a manner that the poles of facing magnets are identical. The two open magnetic circuits then repel each other. This type of structure generates along a measurement axis a magnetic induction field B characterized by a normal component $B_y$ of zero and a periodic tangential component $B_x$. The variation of $B_x$ is then a function of the magnet length L/air gap width d and one obtains an approximately triangular variation with an L/d ratio which is essentially equal to 2. Such a variation is characterized by a high slope and a broad range of linear variation.

According to another aspect of the present invention, the magnets and the flux return yokes of the magnetic circuit have the form of coaxial rings, with the width of the air gap and the polarizations of the magnets being either axial or radial. This disposition allows the construction of linear sensors with axial displacement (radial air gap) or radial displacement (axial air gap), between two of the elements of a rotating assembly, such as a ball bearing.

Having described the invention, what is claimed is:

1. A magnet structure for a linear displacement sensor, the magnet structure comprising:

two magnetic circuits separated by an air gap and respectively made up of a series of permanent magnets attached and rigidly held together by flux return yokes, one side of each of the magnetic circuits facing the air gap such that magnets of one magnetic circuit face opposing magnets of the other magnetic circuit, directions of magnetization of the opposing magnets being antiparallel with respect to opposed magnets, directions of magnetization of magnets of each magnetic circuit being antiparallel with respect to adjacent magnets of the same magnetic circuit, each of the magnets having a length approximately two times larger than the air gap.

2. The magnet structure according to claim 1, wherein each magnetic circuit of permanent magnets is repeated periodically along a direction of displacement and includes at least one measurement device in the center of the air gap.

3. The magnet structure according to claim 1, wherein each of the magnetic circuits includes at least one central magnet and adjacent lateral magnets, the central and lateral magnets each having a width, the width of the lateral magnets being essentially half of the width of an adjacent central magnet.

4. The magnet structure according to claim 1 wherein the magnet structure is an integral part of a ring and delimits a ring-shaped air gap in which is placed at least one measurement probe, which is an integral part of a support mounted on another ring.

5. The magnet structure according to claim 2 wherein the magnet structure is an integral part of a ring and delimits a ring-shaped air gap.

6. The magnet structure according to claim 3 wherein the magnet structure is an integral part of a ring and delimits a ring-shaped air gap in which is placed at least one measurement probe, which is an integral part of a support mounted on another ring.

7. A magnet structure for a linear displacement sensor, the magnet structure comprising:

two magnetic circuits separated by an air gap and made up respectively of a series of principal permanent magnets rigidly assembled with secondary magnets such that principal magnets of one magnetic circuit face opposing principal magnets of the other magnetic circuit;

a cross section of the secondary magnets being identical to that of the principal magnets;

a cross section of the principal magnets being identical isosceles triangles having a base facing the air gap;

directions of magnetization of the opposing principal magnets being antiparallel with respect to opposed principal magnets of the other magnetic circuit;

directions of magnetization of the principal magnets being antiparallel with respect to successive principal magnets of the same magnetic circuit;

polarities of the opposing principal magnets being identical to facing portions of opposed principal magnets of the other magnetic circuit;

directions of magnetization of the secondary magnets being parallel to the air gap at the base of their section and in continuity of flux with that of the principal magnets; and the base of the section of each magnet being approximately two times the width of the air gap.

8. The magnet structure according to claim 7, wherein the principal magnets and the secondary magnets have a periodic distribution and the direction of polarization of each principal magnet and secondary magnet is shifted by 90 degrees in the same direction.

9. The magnet structure according to claim 7 wherein the magnet structure is repeated periodically along the direction of displacement and includes at least one measurement device placed in the center of the air gap.

10. The magnet structure according to claim 7 wherein the magnet structure is an integral part of a ring and delimits a ring-shaped air gap in which is placed at least one measurement probe, which is an integral part of a support mounted on another ring.

11. The magnet structure according to claim 8 wherein the magnet structure is repeated periodically along the direction of displacement and includes at least one measurement device placed in the center of the air gap.

12. The magnet structure according to claim 11 wherein the magnet structure is an integral part of a ring and delimits a ring-shaped air gap.

13. The magnet structure according to claim 8 wherein the magnet structure is an integral part of a ring and delimits a ring-shaped air gap in which is placed at least one measurement probe, which is an integral part of a support mounted on another ring.

14. The magnet structure according to claim 9 wherein the magnet structure is an integral part of a ring and delimits a ring-shaped air gap.

* * * * *

UNITED STATES PATENT AND TRADEMARK OFFICE
CERTIFICATE OF CORRECTION

PATENT NO. : 5,313,182
DATED : May 17, 1994
INVENTOR(S) : Claire Blache

It is certified that error appears in the above—identified patent and that said Letters Patent is hereby corrected as shown below:

On the title page, add item [30]:

[30]       Foreign Application Priority Data
   Feb. 28, 1992    [FR]    France . . . . . . . . . 92-02341

Signed and Sealed this

Second Day of May, 1995

Attest:

BRUCE LEHMAN

*Attesting Officer*      *Commissioner of Patents and Trademarks*